(12) United States Patent
Yates

(10) Patent No.: US 12,187,434 B2
(45) Date of Patent: Jan. 7, 2025

(54) PERSONS WITH REDUCED MOBILITY (PRM) SUITE ACCESS WALL ASSEMBLY

(71) Applicant: B/E Aerospace, Inc., Winston-Salem, NC (US)

(72) Inventor: Zane M. Yates, Clemmons, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 260 days.

(21) Appl. No.: 17/741,045

(22) Filed: May 10, 2022

(65) Prior Publication Data
US 2023/0365261 A1  Nov. 16, 2023

(51) Int. Cl.
*B64D 11/06* (2006.01)

(52) U.S. Cl.
CPC ................ *B64D 11/0606* (2014.12)

(58) Field of Classification Search
CPC ............ E05D 15/0604; E05F 2017/007; E05F 11/28; E05B 3/14; E05B 63/143; E05B 65/0858; E05B 65/1093; E06B 3/01; E06B 3/921; E06B 3/509; E06B 3/5072; B64D 11/0606; B64D 11/0602; B64D 11/0023; E04B 2/827
See application file for complete search history.

(56) References Cited

U.S. PATENT DOCUMENTS

| | | | |
|---|---|---|---|
| 6,101,853 A * | 8/2000 | Herr | E05B 79/12 |
| | | | 70/109 |
| 9,469,404 B2 | 10/2016 | Darbyshire et al. | |
| 9,567,085 B2 | 2/2017 | Suzuki et al. | |
| 9,920,559 B2 | 3/2018 | Druckman et al. | |
| 10,179,650 B2 | 1/2019 | Morgan | |
| 10,421,546 B2 | 9/2019 | Dowty et al. | |
| 11,084,587 B2 | 8/2021 | Robinson | |
| 2018/0281963 A1 | 10/2018 | Dowty et al. | |
| 2019/0210733 A1* | 7/2019 | Herault | B64D 11/0604 |
| 2019/0329891 A1 | 10/2019 | Bonnefoy et al. | |

(Continued)

FOREIGN PATENT DOCUMENTS

| | | |
|---|---|---|
| EP | 3936436 A1 | 1/2022 |
| GB | 2190699 A | 11/1987 |

(Continued)

OTHER PUBLICATIONS

Extended European Search Report dated Sep. 11, 2023; European Application No. 23171900.6.

*Primary Examiner* — Christopher D Hutchens
(74) *Attorney, Agent, or Firm* — Suiter Swantz IP

(57) ABSTRACT

A wall assembly for providing access to an aircraft passenger suite from an aisle area is disclosed. The wall assembly includes a base. The wall assembly includes a wall operationally coupled to the base and slidable with respect to the base between an open position and a closed position, the wall configured to be linearly slidable along a forward direction between the open position and the closed position. The wall assembly includes a dual latch system configured to selectively prevent a movement of the wall absent a simultaneous operation of multiple latches, the dual latch system comprising an upper latch; and a lower latch. The dual latch system configured to allow for the movement of the wall when the dual latch system is in an operated state but not necessarily in the unoperated state.

11 Claims, 19 Drawing Sheets

(56) References Cited

U.S. PATENT DOCUMENTS

| | | |
|---|---|---|
| 2021/0171202 A1 | 6/2021 | Bonnefoy et al. |
| 2021/0179254 A1 | 6/2021 | Scotford et al. |
| 2021/0237880 A1 | 8/2021 | Gaston et al. |
| 2022/0009636 A1 | 1/2022 | Frost et al. |
| 2022/0355935 A1* | 11/2022 | Rees ................. B64D 11/0023 |
| 2023/0287720 A1* | 9/2023 | Hoang ................ E05D 15/0652 |

FOREIGN PATENT DOCUMENTS

| | | | |
|---|---|---|---|
| GB | 2586043 A | 2/2021 | |
| WO | 2017066559 A1 | 4/2017 | |
| WO | 2021069886 A1 | 4/2021 | |
| WO | WO-2021069883 A1 * | 4/2021 | ......... B64D 11/0023 |
| WO | 2021084249 A1 | 5/2021 | |
| WO | 2021136935 A1 | 7/2021 | |

\* cited by examiner

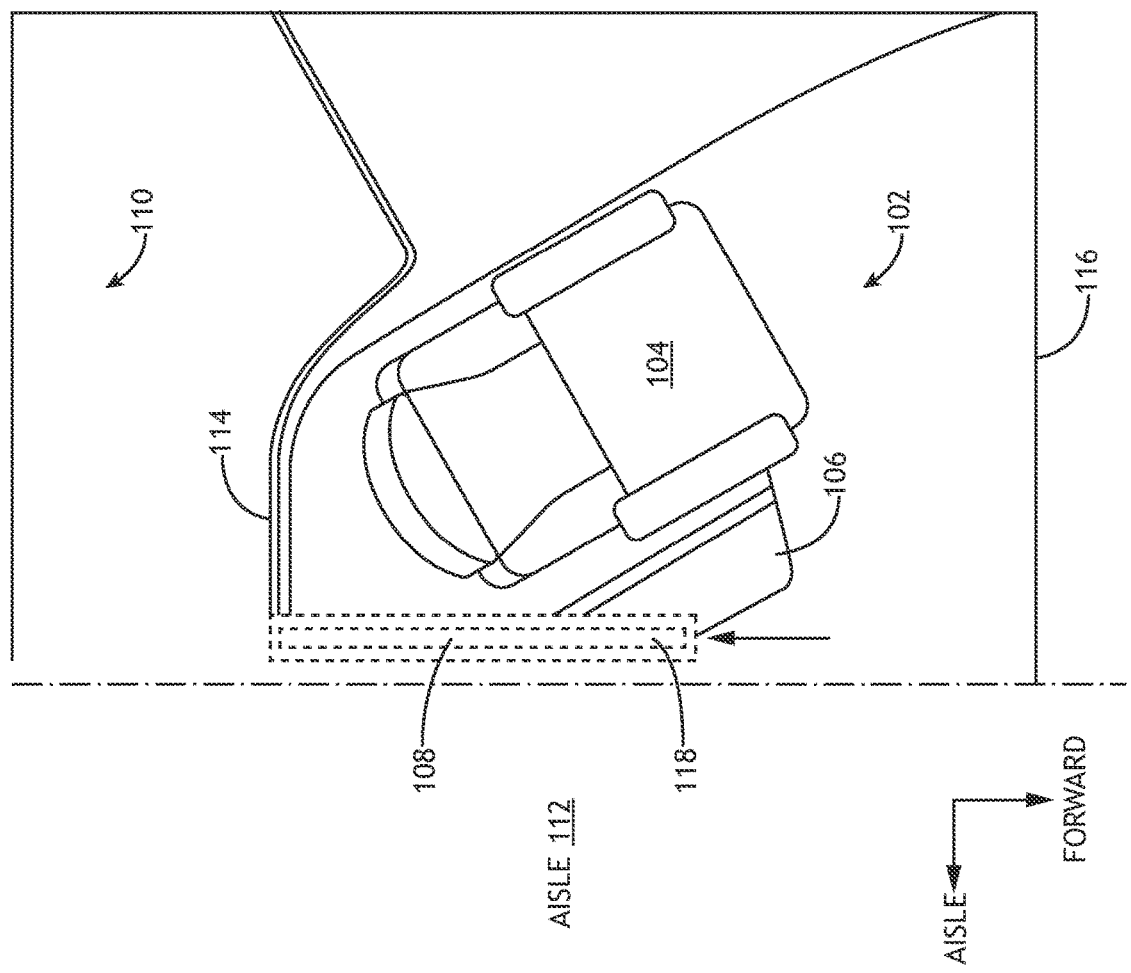

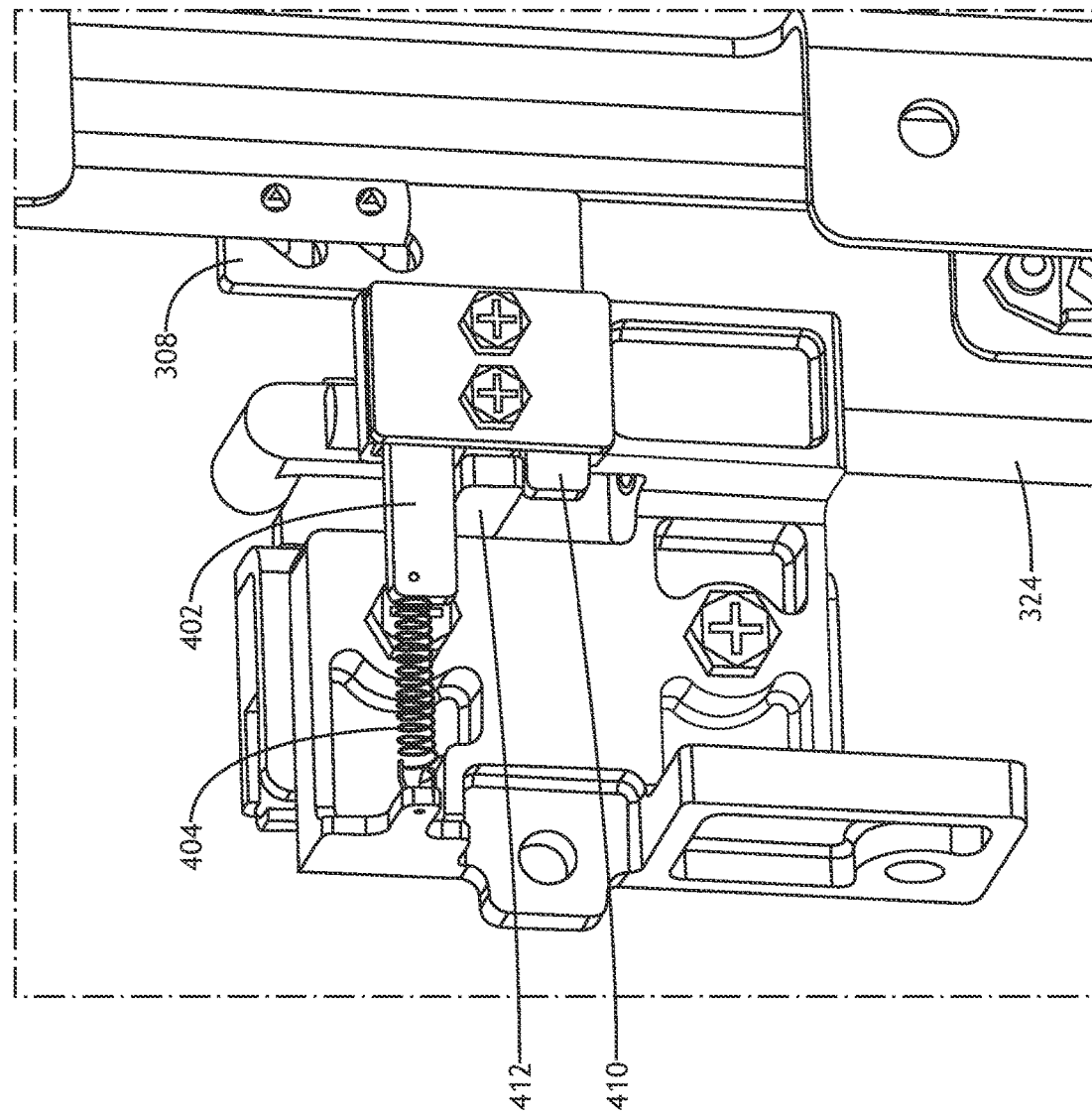

PERSONS WITH REDUCED MOBILITY (PRM) SUITE ACCESS WALL ASSEMBLY

TECHNICAL FIELD

Embodiments of the inventive concepts disclosed herein are directed generally to aircraft wall assemblies and more particularly to aircraft wall assemblies for with increased clearance.

BACKGROUND

Typical wall assemblies in aircraft may impede egress in an aisle when opened and do not typically allow for wide clearances to and from an aircraft seat. Further, current dual latch systems requiring dual latch operation to open and close a door do not provide for reliable operation and low-cost manufacturability.

SUMMARY

A wall assembly for providing access to an aircraft passenger suite from an aisle area is disclosed. The wall assembly includes a base. The wall assembly includes a wall operationally coupled to the base and slidable with respect to the base between an open position and a closed position, the wall configured to be linearly slidable along a forward direction between the open position and the closed position. The wall assembly includes a dual latch system configured to selectively prevent a movement of the wall absent a simultaneous operation of multiple latches, the dual latch system comprising an upper latch; and a lower latch. The dual latch system configured to allow for the movement of the wall when the dual latch system is in an operated state but not necessarily in the unoperated state.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 1D illustrates a top-down schematic view of a wall assembly, in accordance with one or more embodiments of the present disclosure;

FIG. 4E illustrates a view of the various elements of FIG. 4D viewed from an opposite side, in accordance with one or more embodiments of the present disclosure;

DETAILED DESCRIPTION

Figure 1A:
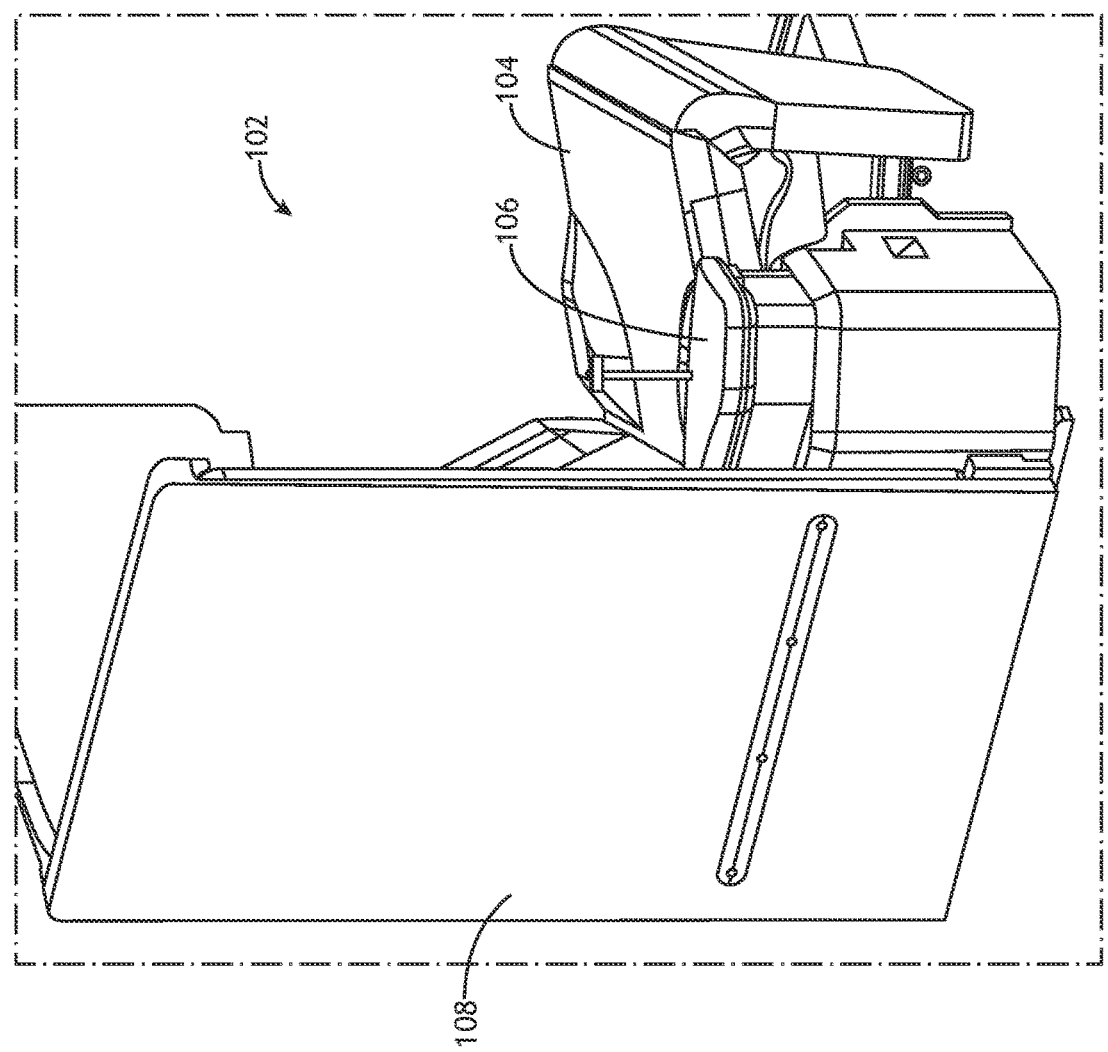
FIG. 1A illustrates a wall assembly including a wall in a closed position, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Broadly speaking, embodiments of the inventive concepts disclosed herein are directed to wall assemblies with a linearly slidable wall that does not impede egress in an aisle when opened and comprises a dual latch mechanism.

It is contemplated herein that current wall assemblies for aircraft suites do not allow for practical movements that minimally impact egress in the aircraft. For example, current wall assemblies may swing into the aisle, blocking egress, or not open to the extent that may be desired.

It is contemplated herein that in order to more effectively allow a passenger with reduced mobility (PRM) to enter their aircraft seat, a door may need to be able to move out of the way to a certain extent. For example, for a seat proximate to a door, a passenger may more effectively be seated by traveling over an armrest of a seat from the side of the seat, but the door of conventional designs may block such a path over the armrest, even when the door is in an open position. It is contemplated that linearly sliding doors at an angle to the aisle may slide into the aisle and hinged doors may swing into the aisle. A wall assembly that addresses at least some of the challenges above may be desired.

Figure 1B:
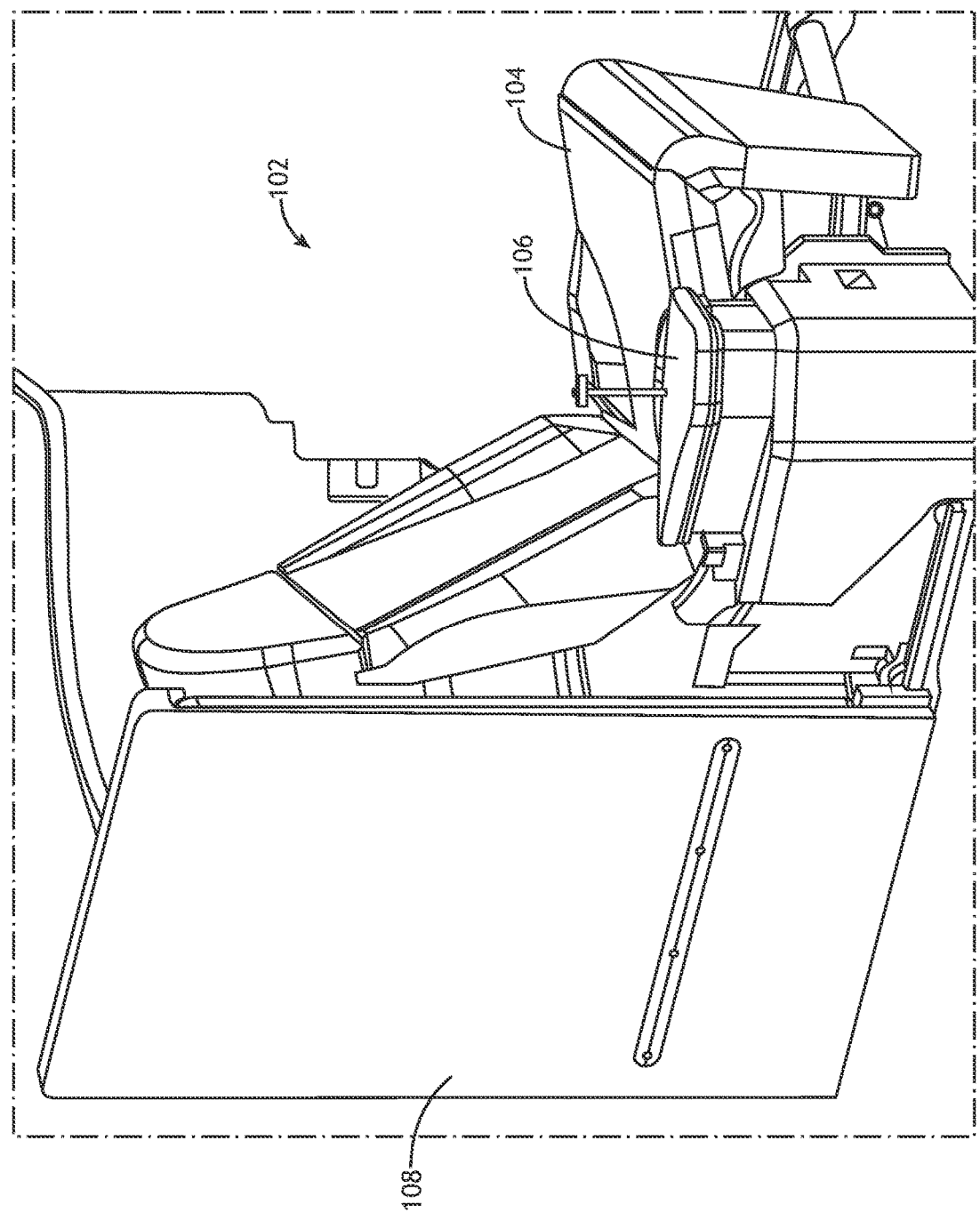
FIG. 1B illustrates a wall assembly including a wall in an open position, in accordance with one or more embodiments of the present disclosure.

Referring to FIG. 1A, a wall assembly including a wall 108 in a closed position is disclosed, in accordance with one or more embodiments of the present disclosure. The open position is shown in FIG. 1B. In embodiments, the wall assembly provides access (egress) to an aircraft passenger suite 102 from an aisle area 112. In embodiments, the wall assembly includes a wall 108, a base (see, e.g., at least base 500 in FIG. 5 and any other element configured to be fixed in place (e.g., armrest 106)), and a dual latch system 300 (see FIG. 3B). Note that "in embodiments" generally means, unless otherwise noted, "in at least one embodiment".

In embodiments, when the wall 108 is in the open position (as shown in FIG. 1A), a rearward portion of the wall (e.g., the portion sticking out behind the suite 102) is outside the aircraft passenger suite 102 in a rearward direction, and when the wall 108 is in the closed position, the rearward portion of the wall is inside the aircraft passenger suite 102 such that the rearward portion of the wall defines a boundary of the aircraft passenger suite 102. It is contemplated herein that in at least some embodiments, such a limitation allows for efficient use of space by allowing the door to slide far enough out of the way for a person to have a path over the armrest 106 into the seat 104 (e.g., aircraft seat) and doing so without blocking egress in the aisle area 112. For example, the wall 108 may be configured to be outside the aisle area 112 when in the open position and the closed position.

In embodiments, the wall 108 is operationally coupled to the base and slidable with respect to a base 500 between an open position and a closed position, the wall 108 configured to be linearly slidable along a forward direction between the open position and the closed position.

In embodiments, the dual latch system 300 is configured to selectively prevent a movement of the wall 108 absent a simultaneous operation of multiple latches. For example, the dual latch system 300 may require dual hand operation to operate both latches simultaneously, which may increase safety by reducing a likelihood of unintended operation. For instance, the dual latch system 300 may be configured to allow for the movement of the wall when the dual latch system is in an operated state (e.g., when both latches are unlatched). For example, the dual latch system may be configured to be in an unoperated state (e.g., by default) and in the operated state when the upper latch 302 is in an upper latch operated state and the lower latch 304 is in a lower latch operated state.

Figure 2:
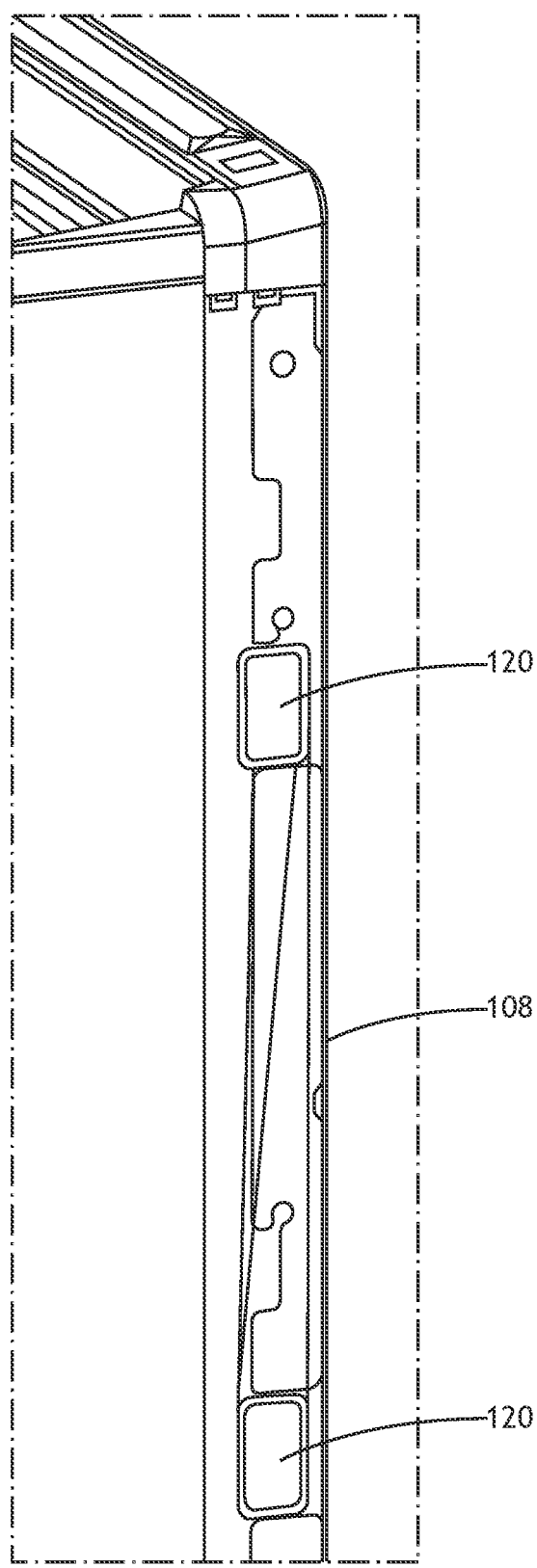
FIG. 2 illustrates mechanisms of a wall, in accordance with one or more embodiments of the present disclosure.

In at least one example, the dual latch system 300 comprises an upper latch 302 and a lower latch 304 operable by an upper mechanism 120 and a lower mechanism 120 (as shown in FIG. 2). In a non-limiting example, the upper mechanism 120 and the lower mechanism 120 comprise at least one of a button, a switch, or a paddle latch handle.

Figure 1C:
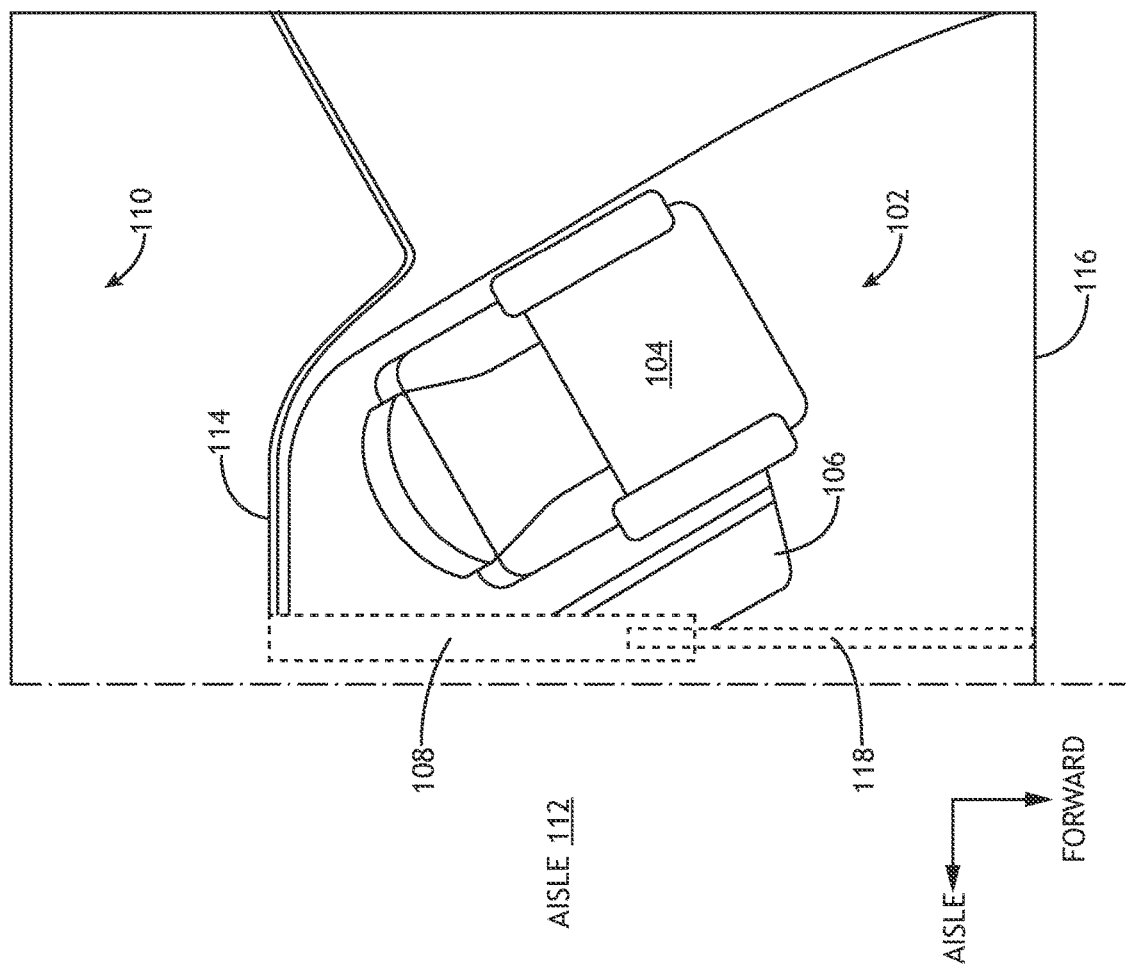
FIG. 1C illustrates a top-down schematic view of a wall assembly, in accordance with one or more embodiments of the present disclosure.

Referring to FIGS. 1C and 1D, a top-down schematic view of a wall assembly is disclosed, in accordance with one or more embodiments of the present disclosure. The wall assembly may be configured to be used in an aircraft layout as shown with other passenger suites 110 adjacent to the aircraft passenger suite 102. In this regard, the wall 108 in an open position may take up a portion of space of other passenger suites 110 as shown in FIG. 1D. The other passenger suites 110 may be separated by a separation wall 114 or other separation wall 116.

In embodiments, the wall assembly may include a secondary wall 118.

In embodiments, the secondary wall 118 is operationally coupled to the wall 108 and configured to be linearly slidable from an unextended position (as shown in FIG. 1C) to an extended position (as shown in FIG. 1D) along the forward direction with respect to the wall 108. For example, the secondary wall 118 may be configured to further define the boundary of the aircraft passenger suite 102 and to block egress to the aisle area 112 from the aircraft passenger suite 102 when the wall 108 is in the closed position and the secondary wall 118 is in the extended position. In this regard, the combination of the wall 108 in a closed position and the secondary wall 118 in an extended position may provide privacy to the aircraft passenger suite 102. It is noted herein that current guidelines may require the secondary wall 118 to be closed during boarding of an aircraft and therefore the space of an adjacent suite 110 may be available (e.g., not occupied by the secondary wall 118) for the wall 108 to be opened rearwards when boarding a passenger into the seat 104 (e.g., over the armrest 106).

Referring to FIG. 2, mechanisms 120 of a wall 108 are disclosed, in accordance with one or more embodiments of the present disclosure. Such mechanisms 120 may be located anywhere such as on a rearward edge of the wall 108 as shown in FIG. 3A.

Figure 3A:
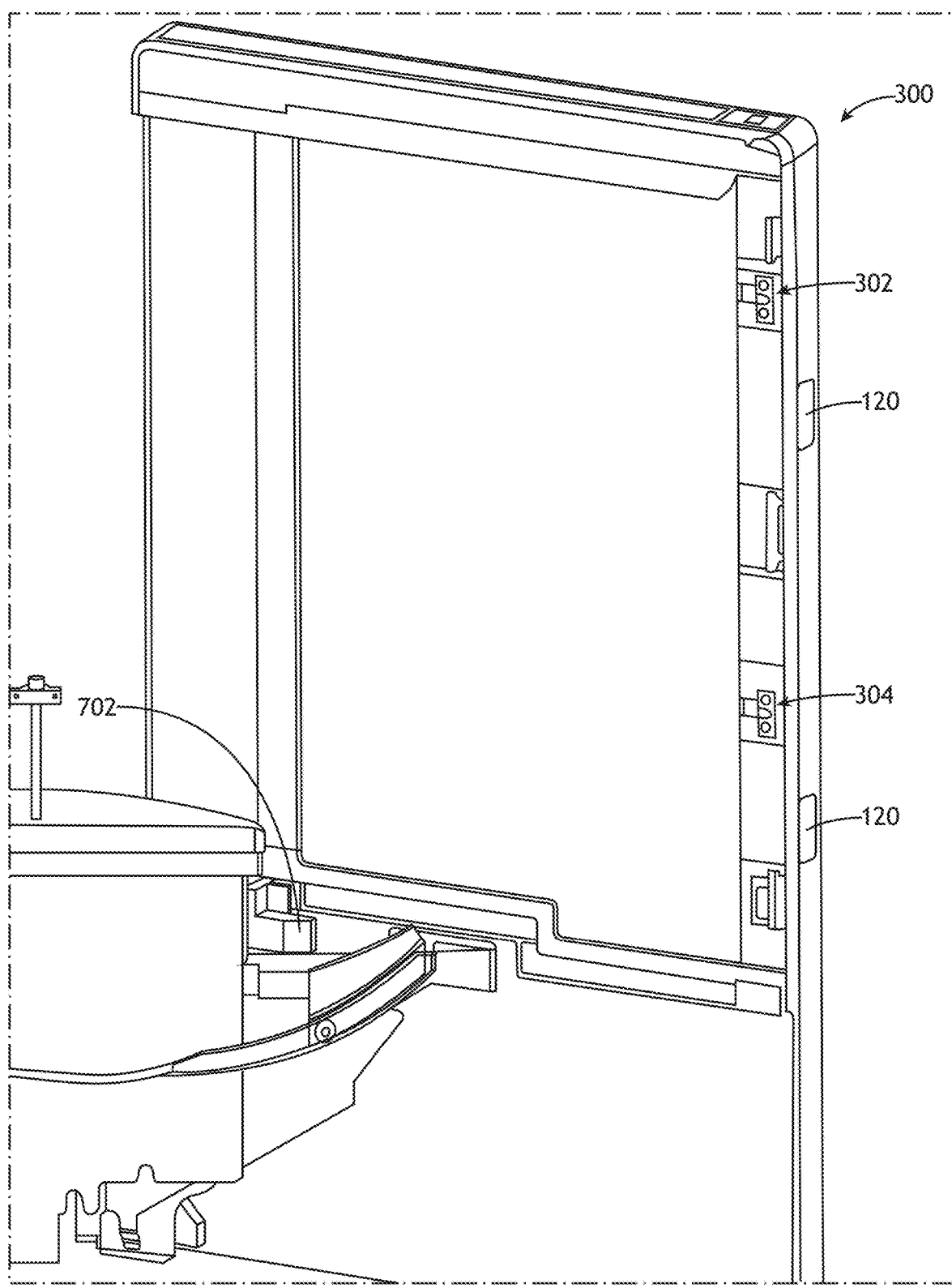
FIG. 3A illustrates an inside cutaway view of various elements of a wall assembly and dual latch system, in accordance with one or more embodiments of the present disclosure.

Referring to FIG. 3A, an inside cutaway view of various elements of a wall assembly and dual latch system 300 is disclosed, in accordance with one or more embodiments of the present disclosure. For example, the dual latch system 300 may include an upper latch 302 and a lower latch 304 as shown.

In embodiments, the upper latch 302 is configured to be in the upper latch operated state when the upper mechanism is in an upper mechanism operated state.

In embodiments, the lower latch 304 is configured to be in the lower latch operated state when the lower mechanism is in a lower mechanism operated state and the upper mechanism is in the upper mechanism operated state. In this regard, unlatching the lower latch 304 may require operating two mechanisms 120 (e.g., buttons), but operating the upper latch 302 may only require operating the upper mechanism. However, in some embodiments, the result is that to fully unlatch the wall 108, both mechanisms must be simultaneously operated since any single latch may prevent movement of the wall.

In embodiments, the wall 108 includes a fixed catch 702 as shown for stabilizing the wall 108 when the wall 108 is in a closed position.

In embodiments, the wall further comprises a gas spring (not shown) structurally and operationally coupled to the wall and the base and configured to provide an assisting force corresponding to a movement of the wall in the rearward direction at least when the wall is in the closed position. In this regard, the gas spring may help overcome static friction and also help indicate when the wall is not properly latched by forcing the wall to not be too close to the latched position without being fully latched.

Referring to FIGS. 3B-4E, a cutaway view of various elements of a dual latch system 300 are disclosed, in accordance with one or more embodiments of the present disclosure.

In embodiments, the dual latch system 300 further includes an upper member 326 (e.g., comprising an inter-latch portion 306 between latches), a lower member 328, and a stop member 308 (e.g., configured to stop a movement of the lower member 328).

For example, the upper member 326 may be configured to be linearly slidable in a vertical direction. In one example, the upper member 326 is configured to be operationally coupled to the upper mechanism 120, the upper latch 302, and a stop member 308. The upper mechanism 120 may be configured to cause a vertical upper member movement of the upper member 326 when the upper mechanism 120 is in the upper mechanism operated state (e.g., due to pushing the mechanism/button 120).

In embodiments, the stop member 308 comprises a stop portion 410 (e.g., to stop a movement of the lower member 328).

Figure 4A:
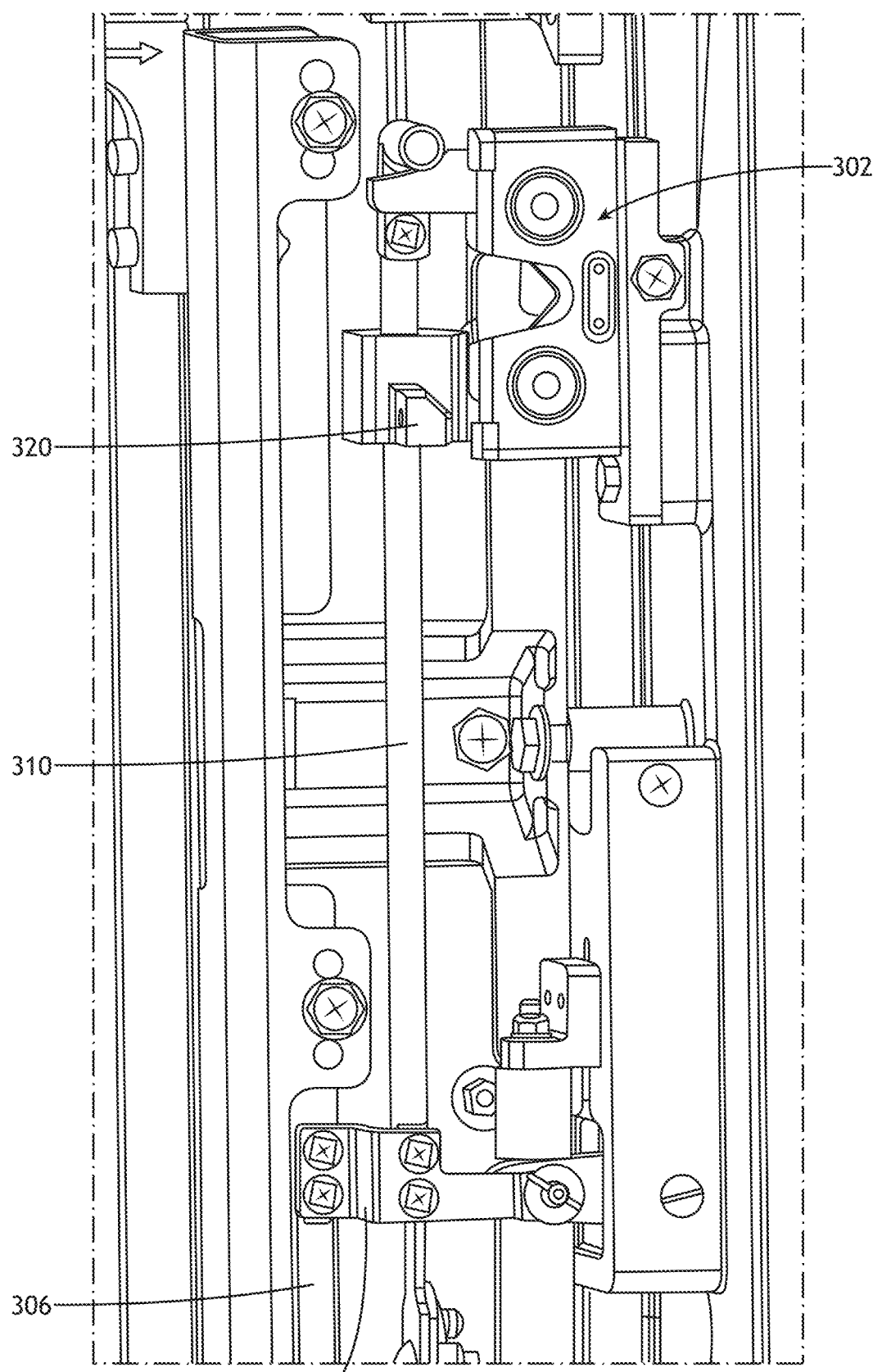
FIG. 4A illustrates a cutaway view of various elements of an upper area of a dual latch system, in accordance with one or more embodiments of the present disclosure.
Figure 4B:
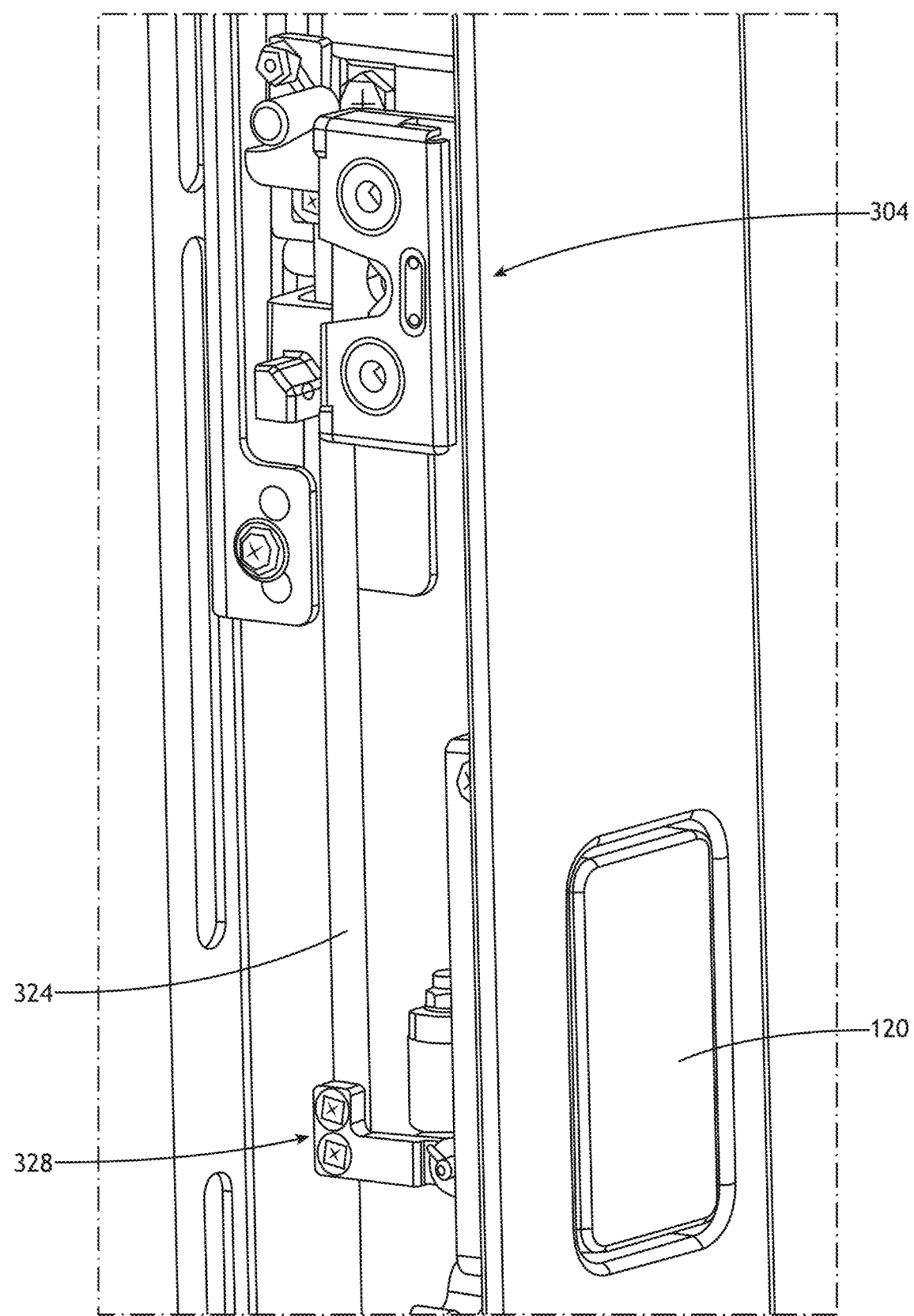
FIG. 4B illustrates a cutaway view of various elements of a lower area of a dual latch system, in accordance with one or more embodiments of the present disclosure.
Figure 4C:
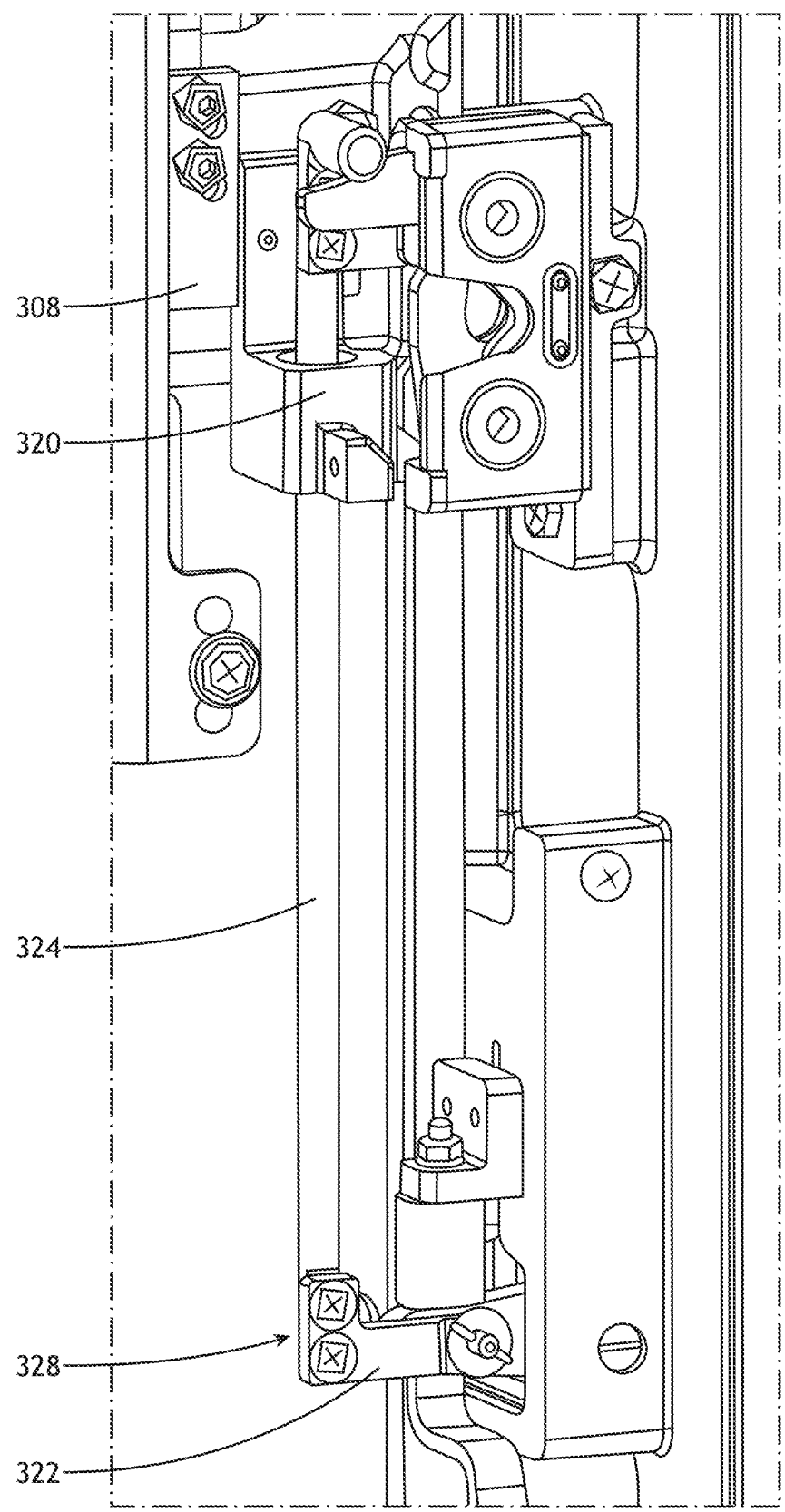
FIG. 4C illustrates a cutaway view of various elements of a lower area of a dual latch system, in accordance with one or more embodiments of the present disclosure.
Figure 4D:
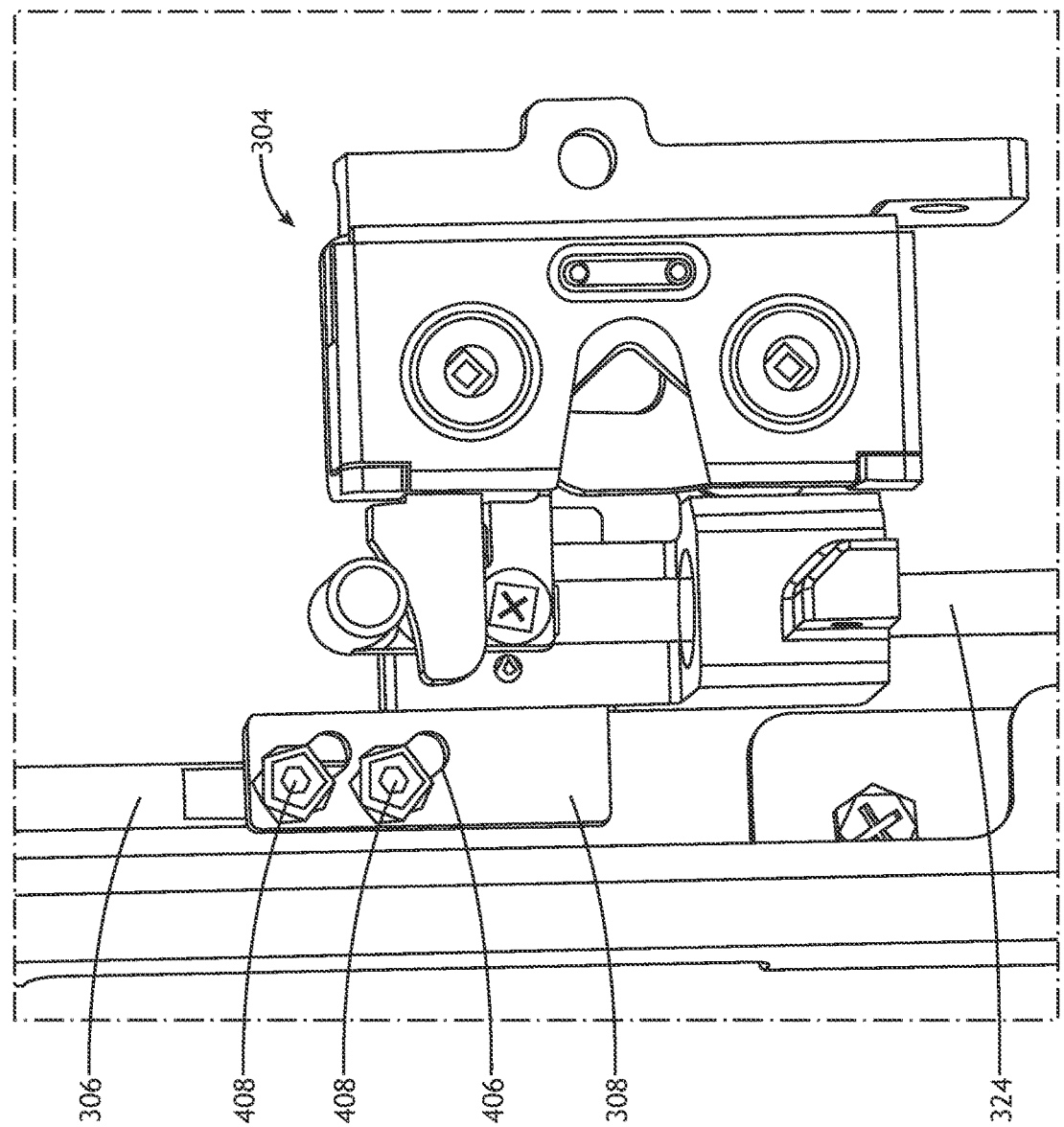
FIG. 4D illustrates a view of various elements of a lower area of a dual latch system, in accordance with one or more embodiments of the present disclosure.

In embodiments, the stop member 308 is configured to be linearly slidable in a horizontal direction from a stopping position (e.g., as shown in FIG. 4D) to a non-stopping position (not shown) based on the vertical upper member movement (e.g., due to slots 406). For example, slots 406 may translate a vertical movement of the upper member 326 to a horizontal movement of the stop member 308.

In embodiments, the stop member 308 comprises an angled slot 406 (or multiple slots) defined by surfaces of the stop member 308. For example, the angled slot 406 may be operationally coupled to the inter-latch portion 306 and configured to allow for a movement of the stop member 308 to the non-stopping position based on a force on an angled surface of the angled slot 406 caused by the vertical upper member movement of the upper member 326. In one example, cylinders 408 (e.g., pins, bolts) are used to cause the force on the angled slots 406. The cylinders may have heads as shown to contain the stop member 308.

In embodiments, the stop member 308 is operationally coupled to the inter-latch portion 306 of the upper member 326.

In embodiments, a lower member 328 is configured to be operationally coupled to the lower mechanism 120 and the lower latch 304.

In embodiments, the lower member 328 is further configured to be selectively blocked from a movement of the lower member 328 in the vertical direction by the stop portion 410 of the stop member 308.

In embodiments, the stop portion 410 is configured to block the movement of the lower member 328 when the stop member 308 is in the stopping position and allow the movement of the lower member 328 when the stop member 308 is in the non-stopping position. For example, the stop portion 410 may engage a protrusion 412 of the lower member 328.

In one example, the stop member 308 is configured to return to the stopping position via a spring 404. For instance, the stop member 308 may include a horizontal protrusion 402 coupled to the spring 404.

In embodiments, the lower mechanism 120 is configured to cause the movement of the lower member 328 when the lower mechanism 120 is in the lower mechanism operated state and the stop member 308 is in the non-stopping position (e.g., dual hand operation).

Figure 3B:
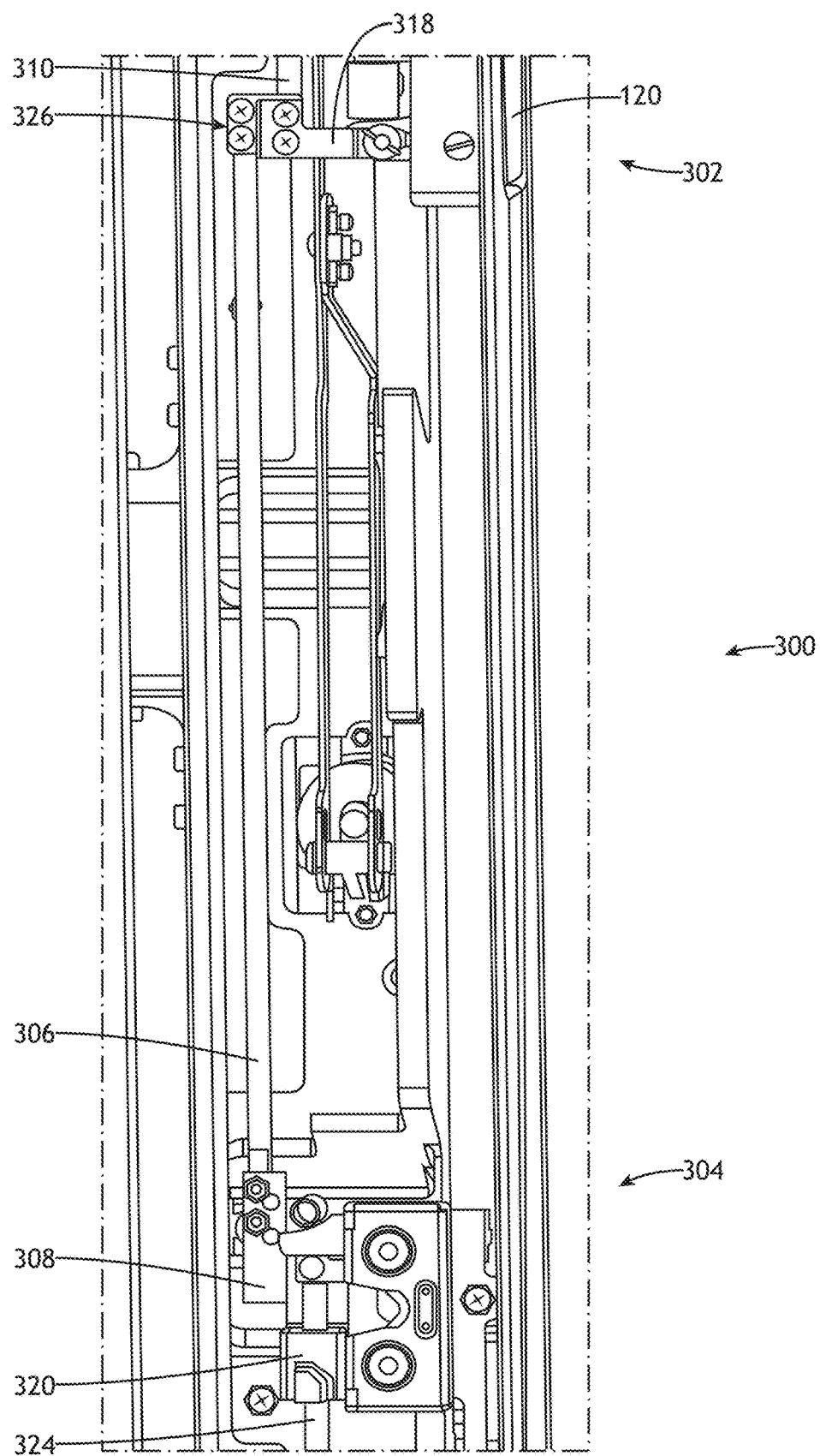
FIG. 3B illustrates a cutaway view of various elements of an upper and lower area of a dual latch system, in accordance with one or more embodiments of the present disclosure.

In embodiments, the inter-latch portion 306 of the upper member 326 is structurally fixed (e.g., mechanically fastened, welded, and the like) relative to an upper cross member 318 of the upper member 326 (as shown FIG. 3B). In one example, the upper cross member 318 may be structurally fixed relative to an upper vertical member 310 of the upper member 326. In some embodiments, the inter-latch portion 306, upper vertical member 310, and lower vertical member 324 are thin members (e.g., steel rods or the like).

In embodiments, the lower member 328 may include a lower vertical member 324 and a lower cross member 322.

The lower member 328 may be structurally fixed relative to a lower cross member. In one example, the lower vertical member comprises a protrusion configured to be selectively blocked by the stop portion 410 of the stop member 308.

In embodiments, the dual latch system 300 further comprises one or more guides 320 configured to allow for linear movements and provide structural support to one or more components of the dual latch system 300.

Figure 5:
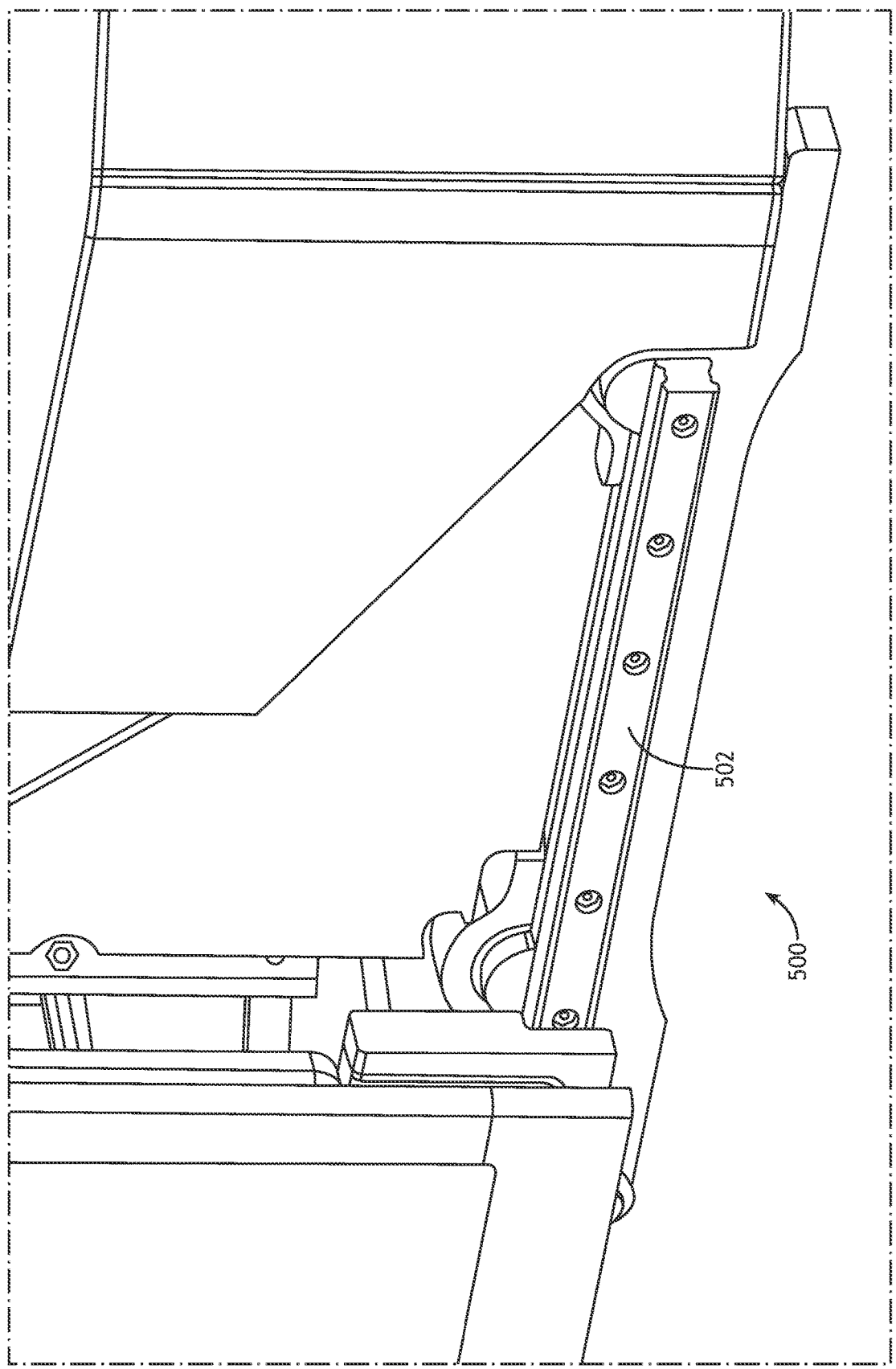
FIG. 5 illustrates a base of a wall assembly, in accordance with one or more embodiments of the present disclosure.

Referring to FIG. 5, a base 500 of a wall assembly is disclosed, in accordance with one or more embodiments of the present disclosure. The base 500 may include a rail 502 that provide for a surface that the wall 108 may use to enable linear sliding. Note that sliding, slidable, and the like may mean surface sliding and/or rolling (e.g., via wheels).

Figure 6A:
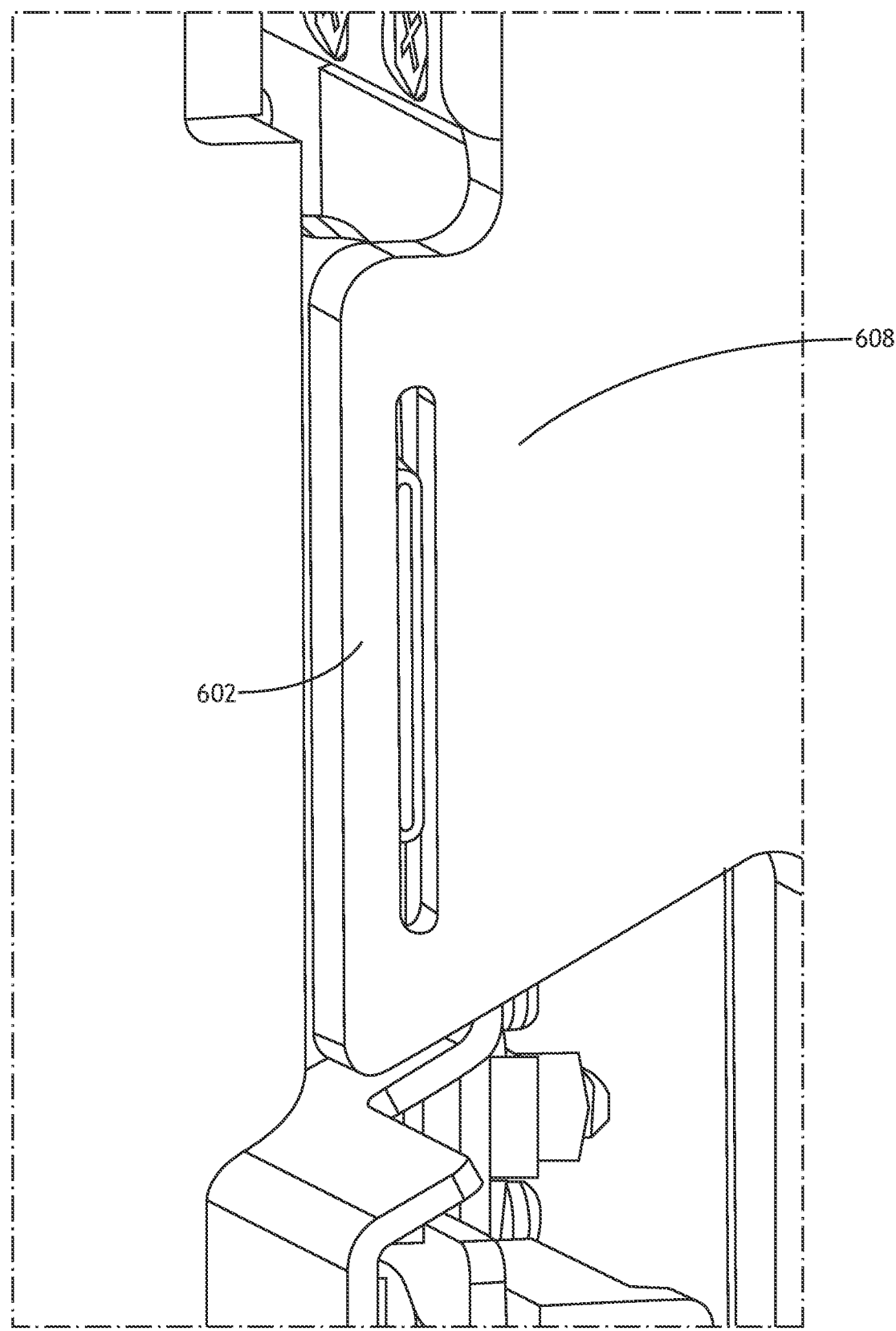
FIG. 6A illustrates a tapered catch of a wall assembly in an open position, in accordance with one or more embodiments of the present disclosure.

Referring to FIG. 6A, a tapered catch 602 of a wall assembly in an open position is disclosed, in accordance with one or more embodiments of the present disclosure.

Figure 6B:
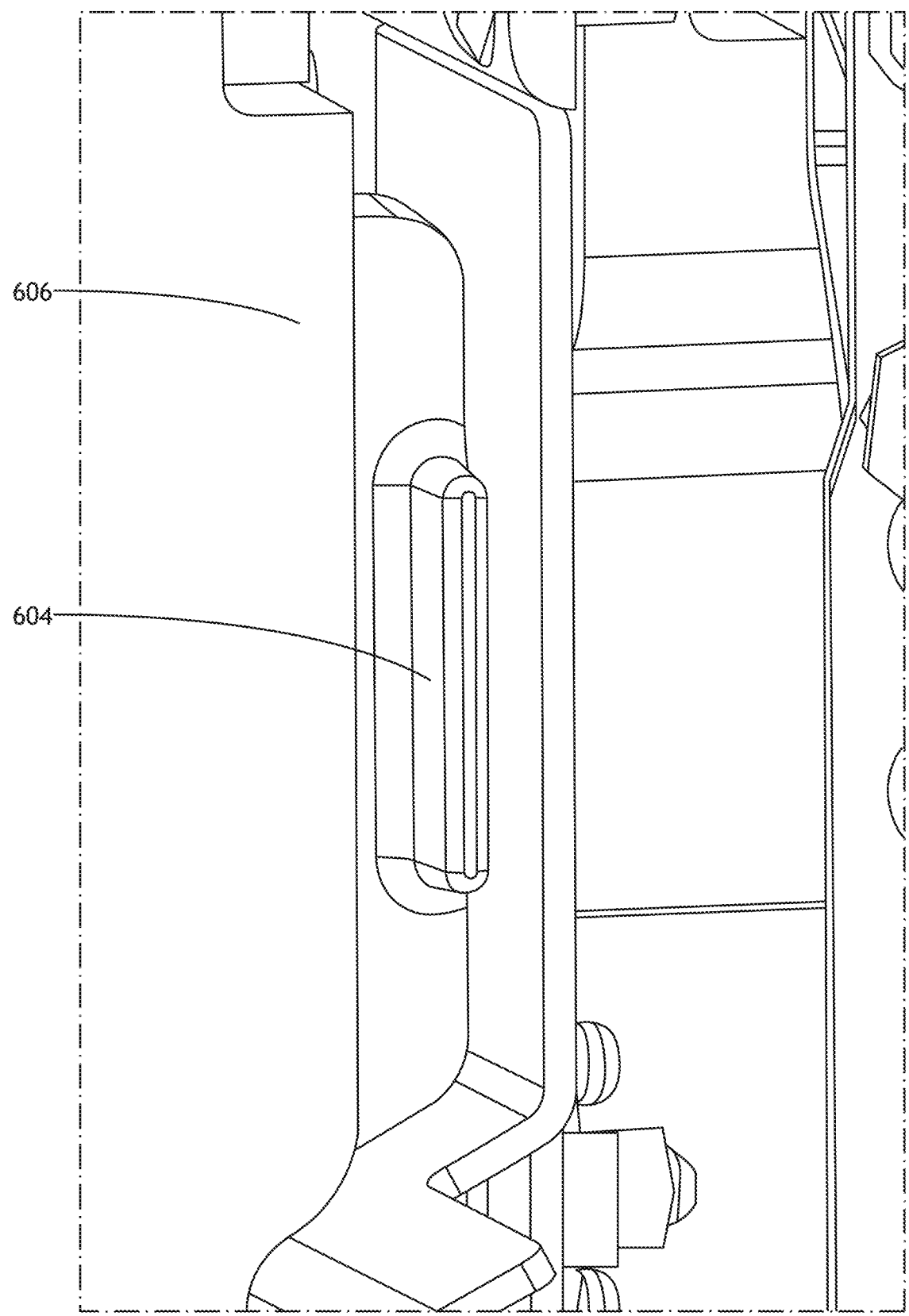
FIG. 6B illustrates a tapered catch of a wall assembly in a closed position, in accordance with one or more embodiments of the present disclosure.

Referring to FIG. 6B, a tapered catch 602 of a wall assembly in a closed position is disclosed, in accordance with one or more embodiments of the present disclosure. As shown the tapered catch 602 may structurally couple and support a slot area 604 of a component 608 such that a structural integrity of the seat 104 is maintained.

Figure 7A:
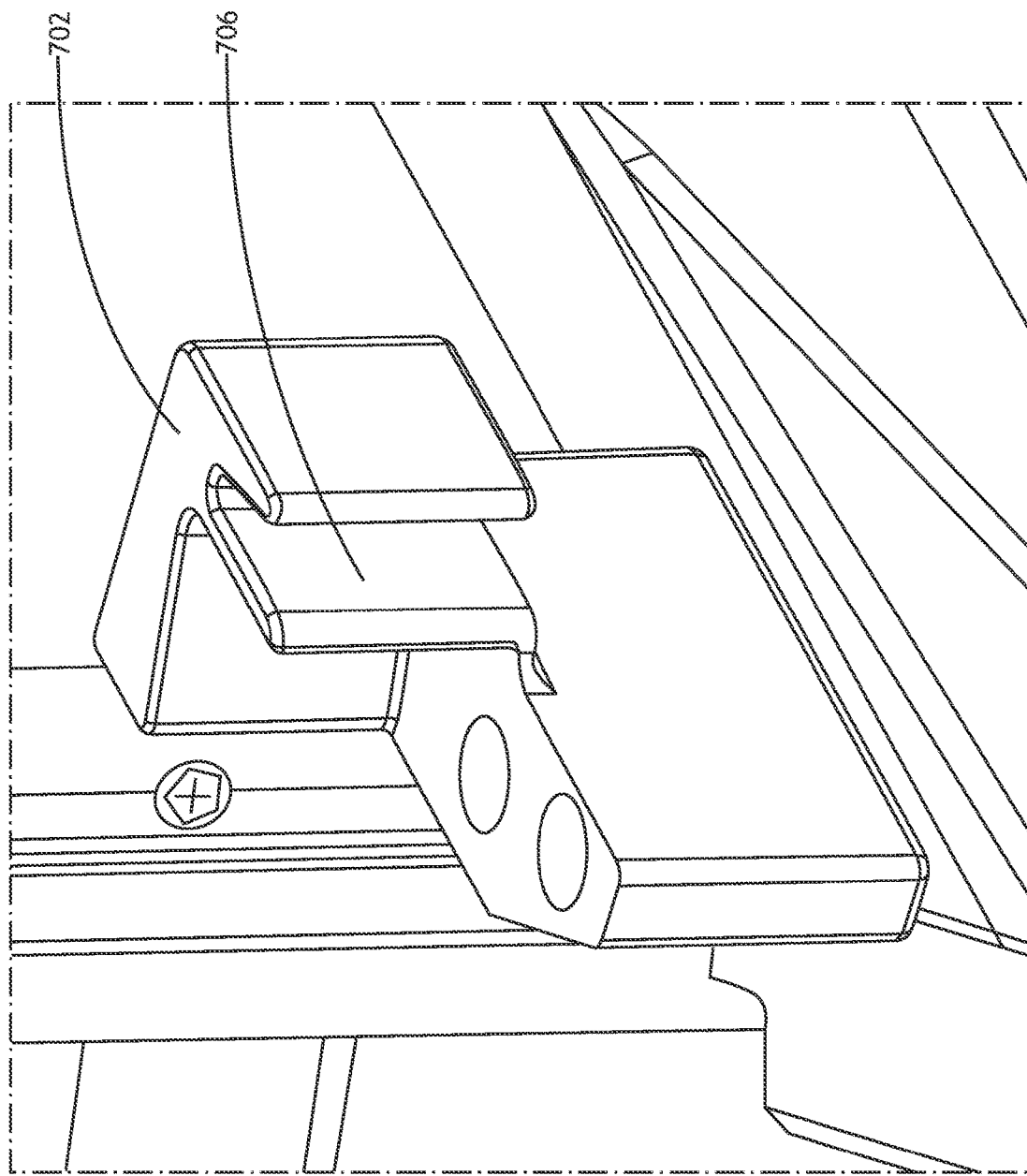
FIG. 7A illustrates a catch of a wall assembly, in accordance with one or more embodiments of the present disclosure.
Figure 7B:
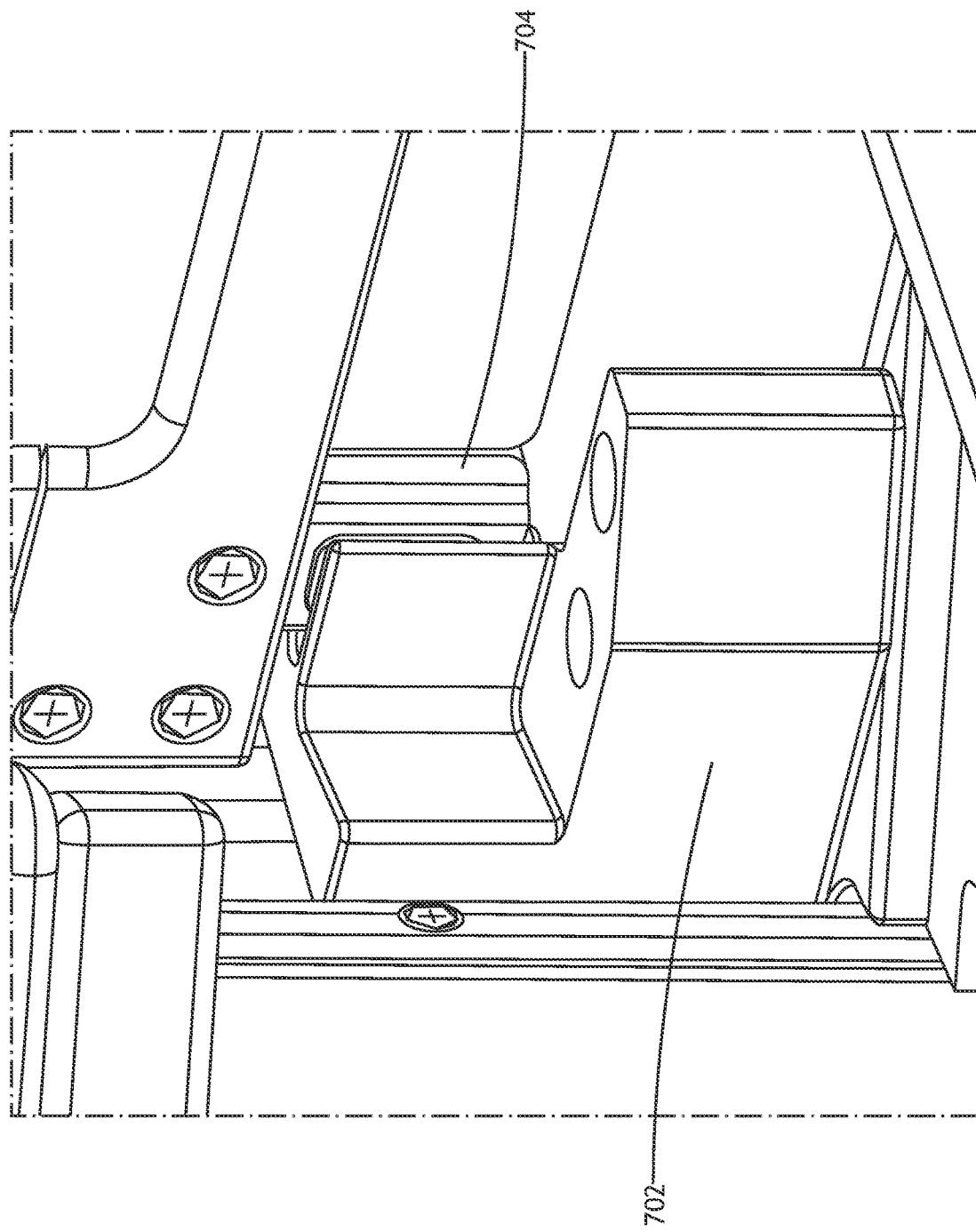
FIG. 7B illustrates a catch and a wedge of a wall assembly, in accordance with one or more embodiments of the present disclosure.
Figure 7C:
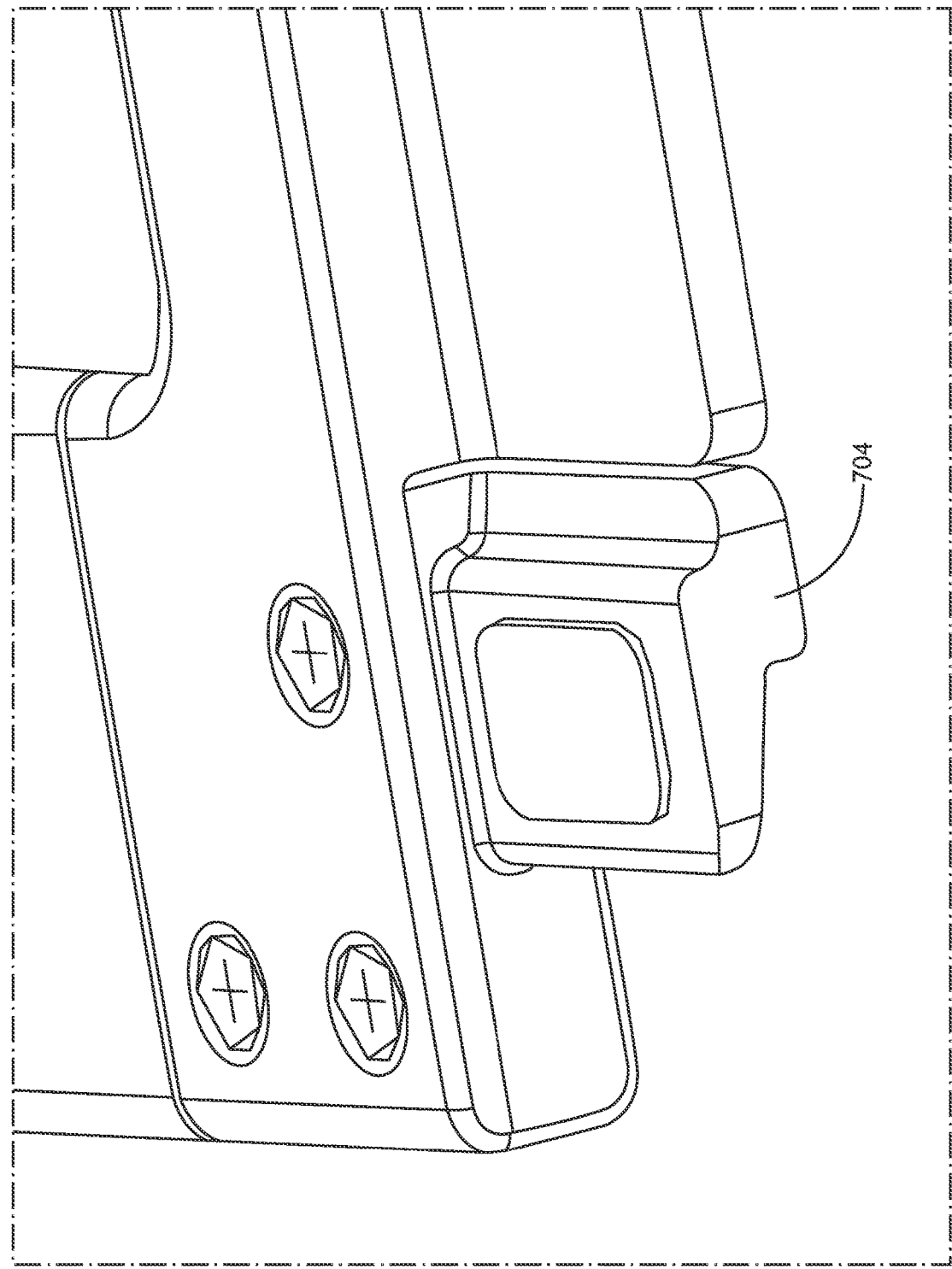
FIG. 7C illustrates a wedge of a wall assembly, in accordance with one or more embodiments of the present disclosure.

Referring to FIGS. 7A-7C, a catch 702 and wedge 704 of a wall assembly are disclosed, in accordance with one or more embodiments of the present disclosure.

In embodiments, the base 500 comprises a catch 702 structurally coupled to the base 500. In embodiments, the wall further comprises a wedge 704 configured to align with the catch 702.

In embodiments, the catch 702 is configured to structurally support the wall 108 by structurally supporting the wedge 704 of the wall 108 when the wall 108 is in the closed position (e.g., an inside portion 706 of the catch may be configured to structurally support two opposing surfaces of the wedge 704).

Figure 8:
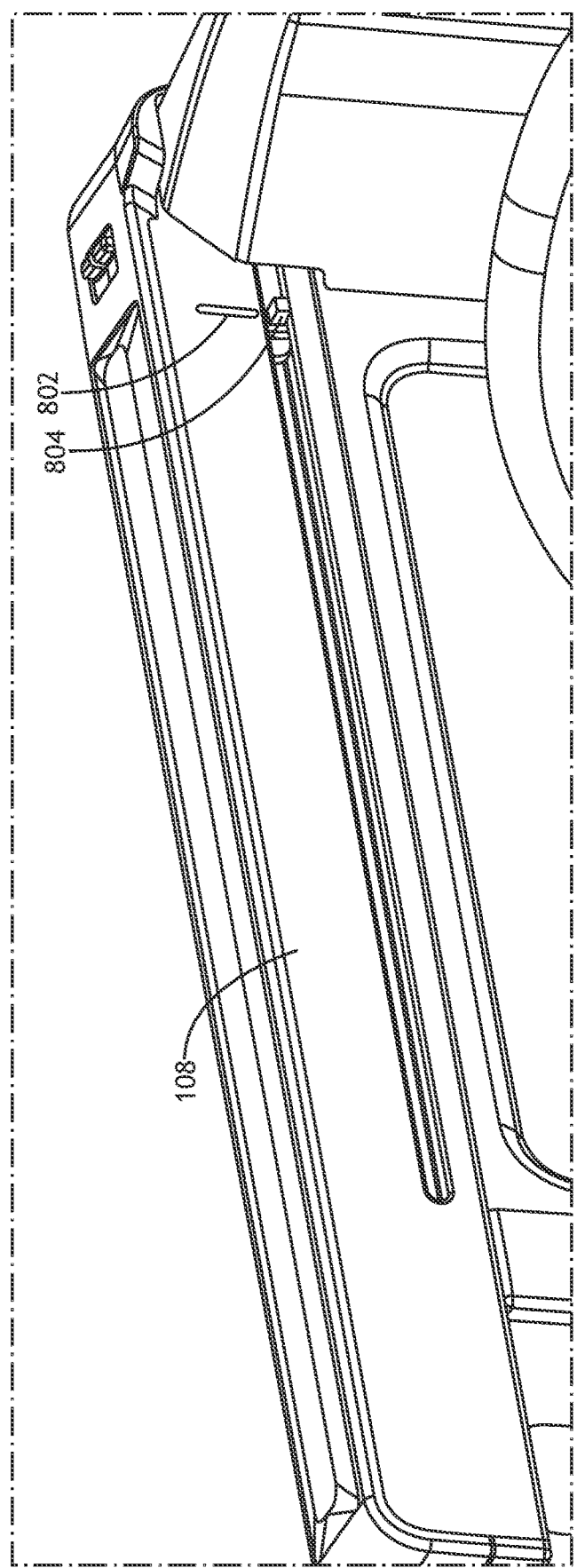
FIG. 8 illustrates an indicator of a wall assembly, in accordance with one or more embodiments of the present disclosure.

Referring to FIG. 8, an indicator 804 of a wall assembly is disclosed, in accordance with one or more embodiments of the present disclosure.

In embodiments, the wall further comprises an indicator mark 802 configured to align with an indicator 804 when the dual latch system 300 is in a latched position.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A wall assembly for providing access to an aircraft passenger suite from an aisle area comprising:
   a base;
   a wall operationally coupled to the base and slidable with respect to the base between an open position and a closed position, the wall configured to be linearly slidable along a forward direction between the open position and the closed position; and
   a dual latch system configured to selectively prevent a movement of the wall absent a simultaneous operation of multiple latches, the dual latch system configured to allow for the movement of the wall when the dual latch system is in an operated state; the dual latch system comprising:
   an upper latch;
   a lower latch, the dual latch system configured to be in the operated state when the upper latch is in an upper latch operated state and the lower latch is in a lower latch operated state;
   an upper mechanism;
   a lower mechanism, the upper latch configured to be in the upper latch operated state when the upper mechanism is in an upper mechanism operated state, the lower latch configured to be in the lower latch operated state when the lower mechanism is in a lower mechanism operated state and the upper mechanism is in the upper mechanism operated state;
   an upper member comprising an inter-latch portion; the upper member configured to be linearly slidable in a vertical direction, the upper member configured to be operationally coupled to the upper mechanism, the upper latch, and a stop member; the upper mechanism configured to cause a vertical upper member movement of the upper member when the upper mechanism is in the upper mechanism operated state;
   the stop member comprising a stop portion, the stop member configured to be linearly slidable in a horizontal direction from a stopping position to a non-stopping position based on the vertical upper member movement, the stop member operationally coupled to the inter-latch portion of the upper member; and
   a lower member configured to be operationally coupled to the lower mechanism and the lower latch, the lower member further configured to be selectively blocked from a movement of the lower member in the vertical direction by the stop portion of the stop member, the stop portion configured to block the movement of the lower member when the stop member is in the stopping position and allow the movement of the lower member when the stop member is in the non-stopping position, the lower mechanism configured to cause the movement of the lower member when the lower mechanism is in the lower mechanism operated state and the stop member is in the non-stopping position.

2. The wall assembly of claim 1,
   wherein, when the wall is in the open position, a rearward portion of the wall is outside the aircraft passenger suite in a rearward direction,
   wherein, when the wall is in the closed position, the rearward portion of the wall is inside the aircraft passenger suite such that the rearward portion of the wall defines a boundary of the aircraft passenger suite.

3. The wall assembly of claim 2, the wall being configured to be outside the aisle area when in the open position and the closed position.

4. The wall assembly of claim 2, the wall comprising a secondary wall operationally coupled to the wall and configured to be linearly slidable from an unextended position to an extended position along the forward direction with respect to the wall, the secondary wall configured to further define the boundary of the aircraft passenger suite and to block egress to the aisle area from the aircraft passenger suite when the wall is in the closed position and the secondary wall is in the extended position.

5. The wall assembly of claim 2, the wall further comprising an indicator mark configured to align with an indicator when the dual latch system is in a latched position.

6. The wall assembly of claim 2,
the base comprising a catch structurally coupled to the base,
the wall further comprising a wedge configured to align with the catch,
the catch configured to structurally support the wall by structurally supporting the wedge of the wall when the wall is in the closed position.

7. The wall assembly of claim 1, the inter-latch portion of the upper member is structurally fixed relative to an upper cross member of the upper member, the upper cross member being structurally fixed relative to an upper vertical member of the upper member.

8. The wall assembly of claim 7, the stop member comprising an angled slot defined by surfaces of the stop member, the angled slot operationally coupled to the inter-latch portion and configured to allow for a movement of the stop member to the non-stopping position based on a force on a surface of the angled slot caused by the vertical upper member movement of the upper member.

9. The wall assembly of claim 1, the lower member comprising:
a lower vertical member structurally fixed relative to a lower cross member, the lower vertical member comprising a protrusion configured to be selectively blocked by the stop portion of the stop member; and
the lower cross member.

10. The wall assembly of claim 1, further comprising one or more guides configured to allow for linear movements and provide structural support to one or more components of the dual latch system.

11. The wall assembly of claim 1, the upper mechanism and the lower mechanism comprising at least one of a button, a switch, or a paddle latch handle.

\* \* \* \* \*